United States Patent
Magerlein

[11] 3,715,346
[45] Feb. 6, 1973

[54] PROCESS FOR THE PREPARATION OF LINCOMYCIN COMPOUNDS

[75] Inventor: Barney J. Magerlein, Portage, Mich.

[73] Assignee: The Upjohn Company, Kalamazoo, Mich.

[22] Filed: Nov. 18, 1970

[21] Appl. No.: 90,846

Related U.S. Application Data

[63] Continuation-in-part of Ser. No. 796,558, Feb. 4, 1969, Pat. No. 3,634,043.

[52] U.S. Cl. ............................................260/210 R
[51] Int. Cl. ..............................................C07c 47/18
[58] Field of Search ................................260/210 R

[56] References Cited

UNITED STATES PATENTS 3,496,163   2/1970   Birkenmeyer et al............260/210 R Primary Examiner—Lewis Gotts
Assistant Examiner—Johnnie R. Brown
Attorney—Hans L. Berneis and John Kekich

[57] ABSTRACT

A simplified process for obtaining active lincomycin compounds of the formula

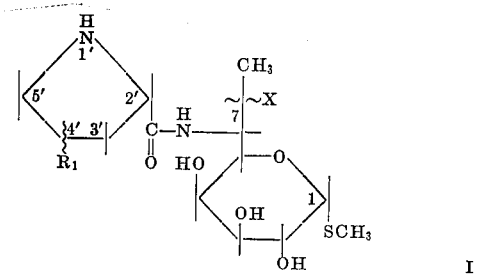

wherein $R_1$ is an alkyl of four to seven carbon atoms, inclusive, and wherein X is selected from the group consisting of 7(R)-hydroxy and 7(S)-chloro, consists of two steps: (1) condensing a 1-carbobenzoxy-4-alkylproline (all four isomers) wherein the alkyl group has four to seven carbon atoms, inclusive, and a methyl thiolincosaminide (III) of the formula:

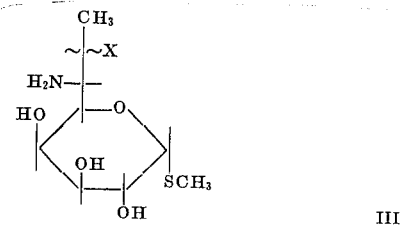

wherein X is defined as herein described above, in water or acetone-water solution; separating the soluble from the insoluble fraction; and (2) removing the protective carbobenzoxy group by hydrogenolysis, separately from each fraction; to obtain an active trans-L and cis-L-lincomycin compound of the formula I above, and separately an analogous trans-D and cis-D-lincomycin product.

6 Claims, No Drawings

PROCESS FOR THE PREPARATION OF LINCOMYCIN COMPOUNDS

CROSS-REFERENCE TO RELATED APPLICATION

This application is a continuation-in-part of application Ser. No. 796,558, filed Feb. 4, 1969, now U.S. Pat. No. 3,634,043.

BACKGROUND OF THE INVENTION

1. Filed of the Invention

This invention is directed to an improved process for producing active lincomycin-type products.

Certain analogs of the antibiotic lincomycin have superior and/or different antibiotic spectra with respect to bacteria, as well as different activities versus certain Plasmodia which produce human and/or animal malaria. Particularly advantageous modifications are: replacement of the propyl group on the proline moiety by a longer chain alkyl radical, e.g., butyl, pentyl, hexyl, or heptyl; replacement of the 1'-methyl group with hydrogen; and replacement of the 7(R)-hydroxy group by 7(S)-chloro. 7(S)-chloro-7-deoxylincomycin is a lincomycin compound known by the generic name "clindamycin." These modified lincomycins can preferably be synthesized by fist preparing a corresponding proline, e.g., one with a pentyl group in the 4-position, and condensing it with a methyl thiolincosaminide. Since the synthetically-prepared proline has two asymmetric centers and thus exists in four isomeric forms, cis-L, cis-D, trans-L, and trans-D, four final lincomycin compounds are obtained. Of these lincomycin products, the trans-L-form is the most active, the cis-L-form is second in activity, and the two D-forms are of low or no activity. By an L-lincomycin compound is meant one in which the prolyl moiety is in the L-form, as in lincomycin itself. By a D-lincomycin compound is meant one in which the prolyl moiety is in the D-form. The terms "trans" and "cis" refer to the relative positions of the 4-alkyl and 2-carboxyl groups of the prolyl moiety.

Conventionally, the four isomeric substituted prolines would be separated, for example as the diastereoisomers, before condensation with the methyl thiolincosaminide. However, this separation has been found to be difficult, incomplete and costly.

In the present invention process the substituted proline, protected by a carbobenzoxy group on the 1-nitrogen, is condensed with the selected methyl thiolincosaminide in a solvent system which essentially quantitatively separates the resulting L-cis and L-trans from the D-cis and D-trans lincomycins by selectively keeping one of the two fractions in solution and precipitating the other. The solvents useful for this reaction are acetone and acetonitrile, each with water present. In the case of 7(R)-OH-type lincomycin compounds the L-prolyl forms remain in solution while the D-prolyl forms precipitate; whereas in the 7(S)-Cl-type lincomycin compounds the D-prolyl forms remain in solution while the L-prolyl forms precipitate.

After hydrogenolyzing the carbobenzoxy group from the desired L-cis and L-trans fraction, a highly active antibiotic is produced in good yield.

The process and resulting products of this invention can be represented illustratively by the following formulas:

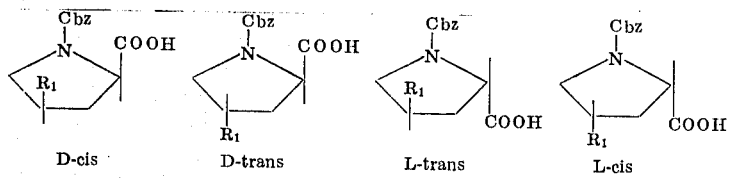

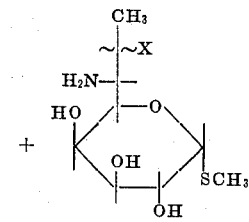

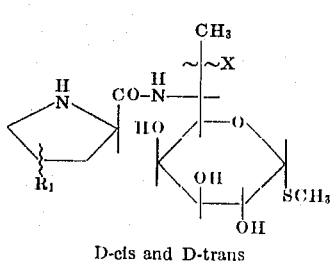

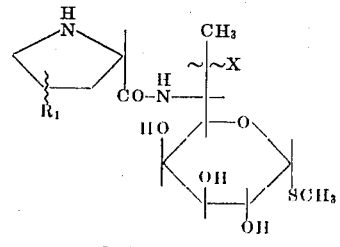

wherein Cbz symbolyzes the carbobenzoxy moiety

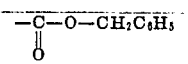

$R_1$ is alkyl of four to seven carbon atoms, inclusive, and X is 7(R)-OH or 7(S)-Cl.

DESCRIPTION OF THE PREFERRED EMBODIMENT

The alkyl group $R_1$ of four to seven carbon atoms, inclusive, comprises n-butyl, n-pentyl, n-hexyl, and n-heptyl, but includes also the branched chain alkyls e.g., isobutyl, isopentyl, 2,3-dimethylpropyl, 1,2-dimethylpropyl, 2,3-dimethylbutyl, isohexyl, isoheptyl, and the like.

The modified lincomycins which are prepared by the novel process are known compounds. [B. J. Magerlein, Antimicrobial Agents and Chemotherapy p. 727–736, 1966]. For example, a comparison of the minimal inhibitory concentrations in micrograms per milliliter, in both dilution tests of lincomycin and 1'-demethyl-4'-depropyl-4'-pentylclindamycin is:

|  | Staphylococcus aureus OSU 284 | S. aureus UC 552 | Escherichia coli ATCC 28 | Salmonella schottmuelleri ATCC 9149 |
|---|---|---|---|---|
| Lincomycin | 0.4 | 0.8 | 400 | 4000 |
| 1'-Demethyl-4'-depropyl 4'-pentyl-clindamycin | 0.025 | 0.025 | 12.5 | 12.5 |

The starting materials of this invention are known in the art, e.g., disclosed in U. S. Pat. No. 3,496,163, patented Feb. 17, 1970, U. S. Pat. No. 3,514,440, patented May 26, 1970, U. S. Pat. No. 3,366,624, patented Jan. 30, 1968, and other patents.

In carrying out the process of the present invention, a selected 1-carbobenzoxy-4-alkylproline (all four isomeric forms) is dissolved in acetonitrile or acetone with triethylamine present and then reacted with isobutyl chloroformate. To this solution after 10–30 minutes there is added a solution of the selected methyl thiolincosaminide in water or aqueous acetone. This mixture is stirred for ½ to 6 hours at a temperature between 10° and 40° C., conveniently at room temperature, 22°–30° C. Filtration gives a solution and a solid. Separation of there two phases and separate hydrogenolysis of each phase with platinum or palladium-on-carbon catalyst and hydrogen, provides an active antibiotic mixture of cis-L- and trans-L-antibiotics and a less active mixture of cis-D and trans-D-antibiotics. In the preferred embodiment a 5–10 percent palladium on charcoal catalyst is used in the hydrogenolysis, in a ratio of 1 part of catalyst to 2 to 4 parts of the carbobenzoxy-protected lincomycin compound. The reaction generally is carried out at room temperatures for a period of 1 to 48 hours. At the termination of the reaction, the mixture is filtered to remove the catalyst, the filtrate is evaporated and the residue is purified by conventional methods, e.g., chromatography, extraction, and recrystallization.

The following Preparations and Examples illustrate the novel process of this invention:

Preparation 1 N-Carbobenzoxy-4-pentylproline

To a solution of 27.5 g. of 4-pentylproline hydrochloride in 450 ml. of water and 72.5 ml. of 4N aqueous sodium hydroxide are simultaneously added over 30 minutes 26 ml. of carbobenzoxy chloride and 415 ml. of 4N aqueous sodium hydroxide. After stirring for 1.5 hours, the basic solution is extracted twice with ether. The aqueous solution is acidified, extracted several times with ethyl acetate, and the extracts evaporated to yield N-carbobenzoxy 4-pentylproline (37.2 g., 94 percent) as an oil.

Example 1

Methyl (4'-cis- and trans-pentyl-1'-carbobenzoxy-L- and D-prolyl)-7-deoxy-7(S)-chlorothiolincosaminide.

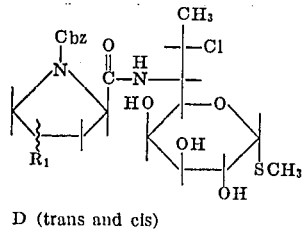

D (trans and cis)

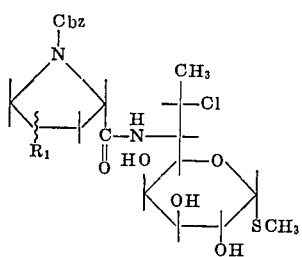

L (trans and cis)

Cbz=carbobenzoxy.

To a solution of 13.3 g. of a mixture of 1-carbobenzoxy-L- and D-4-cis-pentylproline and 1-carbobenzoxy L- and D-4-trans-pentylproline in 300 ml. of acetonitrile containing 5.3 ml. of triethylamine is added 5.1 ml. of isobutyl chloroformate with cooling. After 15 minutes a solution of 10.2 g. of methyl 7-deoxy-7(S)-chlorothiolincosaminide in 250 ml. of 50 percent aqueous acetone is added. The mixture is stirred at ambient temperature for 3 hours. The solution is filtered to give 3.1 g. of methyl (4'-cis- and trans-pentyl-1'-carbobenzoxy-L-prolyl-7-deoxy-7(S)- chlorothiolincosaminide III above of melting point 199°–201° C. dec. The filtrate is concentrated to about 50 percent of its volume. Filtration yields about 10 g of a sticky solid. Recrystallization from acetone gives 3.8 g. of III with melting point 189°–190° dec. A third crop of crystals of melting point 204°–206° C. and weighting 400 mg., precipitates on standing.

The yield of the three fractions is 46.8 percent. In a similar experiment recrystallization from acetone affords methyl (4'-cis- and trans-pentyl-1'-carbobenzoxy-L-prolyl)-7-deoxy-7(S)-chlorothiolincosaminide of melting point 208°–210° C. and rotation $[\alpha]_D = 132°$ (MeOH).

Anal. Calcd. for $C_{27}H_{41}ClN_2O_5S$:

C, 56.58; H, 7.21; N, 4.89.

Found: C, 56.33; H, 7.26; N, 4.66.

Experiments show that the mother liquors contain essentially the D-isomer.

EXAMPLE 2

1'-Demethyl-4'-depropyl-4'-cis- and trans-pentylclindamycin and its hydrochloride.

A mixture of 10.2 g. of 1'-demethyl-1'-carbobenzoxy-4'-depropyl-4'-cis- and trans-pentylclindamycin 190 ml. of methanol and 3.8 g. of 10 percent palladium on carbon is shaken under 40 lbs. hydrogen pressure for 18 hours. The mixture is then filtered, the filtrate distilled in vacuo (15 mm. Hg) to give a residue of 7.0 g. of 1'-demethyl-4'-depropyl-4'-cis- and trans-pentylclindamycin. This material is chromatographed over 700 g. of silica gel using chloroform-methanol (4:1) for elution. Fractions containing the desired compound as monitored by thin layer chromatography are collected; total weight 2.6 g. Conversion to the hydrochloride gives 1.9 g. of 1'-demethyl-4'-depropyl-4'-cis- and trans-pentylclindamycin hydrochloride of melting point 165°–168° C. Recrystallization from aqueous acetone raises the melting point to 171°–173° C.

Anal. Calcd for $C_{19}H_{36}Cl_2N_2O_5S$:

C, 47,99; H, 7.63; N, 5.89; S, 6.74; Cl, 14.91.

Found: C, 47.83; H, 7.58; N, 5.67; S, 6.78; Cl, 15.00. (corrected for 3.50% $H_2O$)

EXAMPLE 3

1'-Carbobenzoxy-1'-demethyl-4'-depropyl-4'-cis- and trans-n-pentyllincomycin and 1'-Carbobenzoxy-1'-demethyl-4'-depropyl-4'-cis- and trans-n-pentyl-D-lincomycin.

Isobutyl chloroformate (7.1 ml.) is added at 0° C. to a solution of 16.5 g. of N-carbobenzoxy-4-pentylproline (all four isomers) and 7.25 ml. of triethylamine in 300 ml. of acetonitrile. After 15 min. a solution of 13.1 g. of methyl thiolincosaminide in 150 ml. of water is added with vigorous stirring. The reaction mixture is stirred at ambient temperature (21.24° C.) for 3 hours. The crystals which precipitate are collected by filtration, washed with aqueous acetonitrile and dried. This is the undesired D isomer, 1'-demethyl-1'-carbobenzoxy-4'-depropyl-4'-trans- and cis-n-pentyl-D-lincomycin of melting point 188°–197° C, and weight 10.75 g., (37.6 percent yield). Recrystallization form methanol affords 7.65 g. of pure material of melting point 198°–207° C. and rotation $[\alpha]_D$ +177° (MeOH).

Anal. Calcd. for $C_{27}H_{42}N_2O_8S$:

C, 58.46; H, 7.63; N, 5.05; S, 5.7.

Found: C, 58.29; H, 7.52; N, 5.07; S, 5.84.

The mother liquor from the above separation is concentrated under vacuum and cooled. Filtration yields 12.05 g. (42.0 percent) of gummy solids of melting point 150°–162°. This material is recrystallized from acetone-methanol to yield 5.75 g. of the desired 1'-carbobenzoxy-1'-demethyl-4'-depropyl-4'-cis- and trans-n-pentyllincomycin of melting point 169°–173° C. and rotation $[\alpha]_D$ +116° (MeOH). Additional crops of this product are obtained at melting point 157°–180° C., rotation $[\alpha]$+91°, 2.0 g.; of melting point 158°–163° C., rotation $[\alpha]_d$ +107°, 1.03 g. All three crops of 1'-demethyl-1'-carbobenzoxy-4'-depropyl-4'-cis- and trans-n-pentyllincomycin are used in the succeeding step.

Anal. Calcd. for $C_{28}H_{42}N_2O_8S$:

C, 58.46; H, 7.63; N, 5.05; S, 5.7.

Found: C, 58.37; H, 7.56; N, 4.85; S, 5.57.

EXAMPLE 4

1'-Demethyl-4'-depropyl-4'-cis- and trans-n-pentyllincomycin and its hydrochloride.

A mixture of 8 g. of 1'-carbobenzoxy-1'-demethyl-4' -depropyl-4'-cis- and trans-n-pentyllincomycin from above and 3 g. of 10 percent palladium on carbon in 150 ml. of methanol is shaken under hydrogen pressure for 18 hours. The catalyst is removed by filtration. The methanol is distilled under vacuum to give 1'-demethyl-4'-depropyl14'-cis- and trans-pentyllincomycin. The material is dissolved in 60 ml. of acetone and 3.8 ml. of 6 N HCl are added. The crystalline salt, 1'-demethyl-4'-depropyl-4'-cis- and trans-n-pentyllincomycin hydrochloride, collected and dried. The yield of this hydrochloride of melting point 206°–208° C., rotation $[\alpha]_D$ +135° ($H_2O$), is 5.0 g.

EXAMPLE 5

Methyl (4'-cis- and trans-butyl-1'-carbobenzoxy-L- and D-propyl)-7-deoxy-7(S)-chlorothiolincosaminide.

In the manner given in Example 1, 1-carbobenzoxy-4-isobutyl chloroformate in the presence of triethylamine and thereafter with methyl 7-deoxy-7-(S)-chlorothiolincosaminide in aqueous acetone gives a precipitate of methyl (4'-cis- and trans-butyl-1'-carbobenzoxy-L-prolyl)-7-deoxy-7(S)-chlorothiolincosaminide and a solution containing the D-prolyl analogues.

EXAMPLE 6

Methyl (4'-cis- and trans-butyl-L-prolyl)-7-deoxy)-7(S)-chlorothiolincosaminide.

In the manner given in Example 2, methyl (4'-cis- and trans-butyl-1'-carbobenzoxy-L-prolyl)-7-deoxy-7(S)-chlorothiolincosaminide in methanol is hydrogenolyzed with a 10 percent palladium on carbon catalyst to give methyl (4'-cis- and trans-butyl-L-prolyl)-7-deoxy-7(S)-chloro-thiolincosaminide.

EXAMPLE 7

Methyl (4'-cis- and trans-hexyl-1'-carbobenzoxy-L- and D-prolyl)-7-deoxy-7(S)-chlorothiolincosaminide.

In the manner given in Example 1, 1 -carbobenzoxy-4-hexyl-L- and D-proline (all four isomers) in acetone is reacted with isobutyl chloroformate in the presence of triethylamine and thereafter with methyl 7-deoxy-7(S)-chlorothiolincosaminide in 50 percent aqueous acetone to give a precipitate of methyl (4'-cis- and trans-hexyl-1'-carbobenzoxy-L-prolyl)-7-deoxy-7(S)-chlorothiolincosaminide and a solution containing the D-prolyl analogues.

EXAMPLE 8

Methyl (4'-cis- and trans-hexyl-L-prolyl)-7-deoxy-7(S)-chlorothiolincosaminide.

In the manner given in Example 2, methyl (4'-cis- and trans-hexyl-1'-carbobenzoxy-L-prolyl)-7-deoxy-7(S)-chlorothiolincosaminide in methanol is hydrogenolyzed with a 10 percent palladium on carbon catalyst to give methyl (4'-cis- and trans-hexyl-L-prolyl)-7-deoxy-7(S)-chlorothiolincosaminide.

EXAMPLE 9

Methyl (4'-cis- and trans-heptyl-1'-carbobenzoxy-L- and D-prolyl)-7-deoxy-7(S)-chlorothiolincosaminide.

In the manner given in Example 1, 1-carbobenzoxy-4-heptyl-L- and D-proline (all four isomers) in acetone is reacted with isobutyl chloroformate in the presence of triethylamine and thereafter with methyl 7-deoxy-7(S)-chlorothiolincosaminide in 50 percent aqueous acetone to give a precipitate of methyl (4'-cis- and trans-heptyl-1'-carbobenzoxy-L-prolyl)-7-deoxy-7(S)-chlorothiolincosaminide and a solution containing the D-prolyl analogues.

EXAMPLE 10

Methyl (4'-cis- and trans-heptyl-L-prolyl)-7-deoxy-7(S)-chlorothiolincosaminide.

In the manner given in Example 2, methyl (4'-cis and trans-heptyl-1'carbobenzoxy-L-prolyl)-7-deoxy-7 chlorothiolincosaminide in methanol is hydrogenolyzed with a 10 percent palladium on carbon catalyst to give methyl (4'-cis- and trans-heptyl-L-prolyl)-7-deoxy-7(S)-chlorothiolincosaminide.

EXAMPLE 11

Methyl cis- and trans- (4'-heptyl-1'-carbobenzoxy-L- and D-prolyl) thiolincosaminide.

In the manner given in Example 3, carbobenzoxy-4-cis- and trans-heptyl-L- and D-proline in acetonitrile is reacted with isobutyl chloroformate in the presence of triethylamine and thereafter with methyl thiolincosaminide in water to give a precipitate of methyl (4'-cis- and trans-heptyl-1'carbobenzoxy-D-prolyl) thiolincosaminide and a solution containing the desired L-prolyl analogue, methyl (4'-cis- and trans-heptyl-1'-carbobenzoxy-L-prolyl) thiolincosaminide, which is isolated and purified by evaporating the solvent and recrystallization from acetone.

EXAMPLE 12

Methyl (4'-cis- and trans-heptyl-L-prolyl) thiolincosaminide.

In the manner given in Example 4, methyl (4'-cis and trans-heptyl-1'carbobenzoxy-L-prolyl)-thiolincosaminide in methanol is hydrogenolyzed with a 10 percent palladium on carbon catalyst to give methyl (4'-cis- and trans-heptyl-L-prolyl)thiolincosaminide.

EXAMPLE 13

Methyl [4'-cis- and trans-(2-methylpentyl)-1'-carbobenzoxy-L- and D-prolyl]thiolincosaminide.

In the manner given in Example 3, 1-carbobenzoxy-4-(2-methylpentyl)proline (all four isomers) in acetonitrile is reacted with isobutyl chloroformate in the presence of triethylamine and thereafter with methyl thiolincosaminide in water to give a precipitate of methyl [4'-cis- and trans-(2-methylpentyl)-1'-carbobenzoxy-D-prolyl] triolincosaminide and a solution containing the L-prolyl analogue, which is isolated by evaporating the solvent, and recrystallized to give pure methyl [4'-cis- and trans-(2-methylpentyl)-1'-carbobenzoxy-L-prolyl]thiolincosaminide.

EXAMPLE 14

Methyl [4'-cis- and trans-(2-methylpentyl)-L-prolyl]thiolincosaminide.

In the manner given in Example 4, methyl [4'-cis- and trans-(2-methylpentyl]-1'-carbobenzoxy]-L-prolyl)thiolincosaminide in methanol is hydrogenolyzed with a 10 percent palladium on carbon catalyst to give methyl [4'-cis- and trans-methylpentyl)-L-prolyl]thiolincosaminide.

In the manner given in Examples 1 and 2 or 3 and 4 other (4'-cis and trans-alkyl-L- and D-prolyl)-7-deoxy-7(S)-chlorothiolincosaminides are prepared.

Representative compounds thus obtained include:
methyl (40'-cis- and trans-isobutyl-L- and D-prolyl)-7-deoxy-7(S)-chlorothiolincosaminide;
methyl (4'-cis- and trans-isopentyl-L- and D-prolyl)-7-deoxy-7(S)-chlorothiolincosaminide;
methyl ]4'-cis- and trans-(3-ethylpentyl)-L- and D-prolyl]-7-deoxy-7(S)-chlorothiolincosaminide;
methyl (4'-cis- and trans-butyl-L- and D-prolyl)thilincosaminide;
methyl (4'-cis- and trans-hexyl-L- and D-prolyl)thiolincosaminide;
and the like.

I claim:

1. A process for the production of an active 1'-demethyllincomycin compound of the formula:

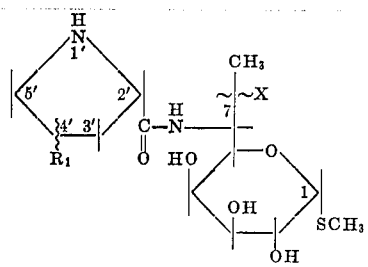

where $R_1$ is an alkyl of four to seven carbon atoms, inclusive; and wherein X is selected from the group consisting of 7(R)-hydroxy and 7(S)-chloro, which comprises:

1. reacting, in acetonitrile or acetone solution, isobutyl chloroformate with a mixture consisting of 1-carbobenzoxy-4-cis- and trans-alkyl-L- and D-proline where the 4-alkyl group is $R_1$, defined as above, and a trialkylamine, followed by an addition of a methyl thiolincosaminide of the formula:

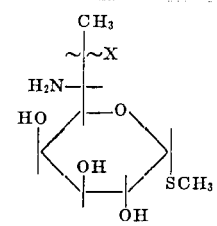

wherein X is defined as above, in an acetone or aqueous acetone solution, separating the insoluble from the soluble fraction; and 2. removing the protective carbobenzoxy group by hydrogenolysis from each fraction separately to obtain an active cis- and trans L- 1'-demethyllincomycin of the formula I above and separately a cis- and trans D-1'-demethyllincomycin.

2. The process of claim 1 wherein the hydrogenolysis is performed with a palladium on carbon catalyst in methanol.

3. The process of claim 1, wherein the trialkylamine is triethylamine.

4. The process of claim 1, wherein $R_1$ is pentyl and X is (S)-chlorine, so that the product is a 1'-demethyl-4'-depropyl-4'-pentylclindamycin.

5. In a process for the production of an active 1-demethyllincomycin compound of the formula:

9

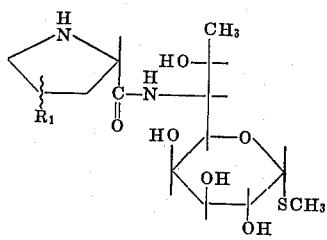

wherein $R_1$ is an alkyl of four to seven carbon atoms, inclusive; the step which comprises:
1. reacting in acetonitrile or acetone solution isobutyl chloroformate with a mixture consisting of 1-carbobenzoxy-4-cis- and trans-alkyl-L- and D-proline wherein the alkyl group is $R_1$, defined as above and a trialkylamine, followed by an additional of methyl thiolincosaminide of the formula:

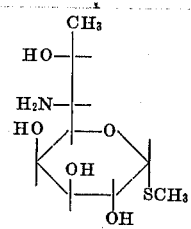

and separating the insoluble 1'-demethyl-1'-carbobenzoxy-4'-depropyl-4'-cis- and trans-alkyl-D-lincomycin from the soluble 1'-demethyl-1'-carbobenzoxy-4'-depropyl-4'-cis- and trans-alkyl-L-lincomycin.

6. In a process for the products of an active 1'-demethyl lincomycin compound of the formula:

10

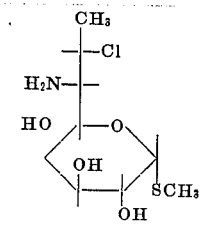

wherein $R_1$ is an alkyl of four to seven carbon atoms, inclusive; the step which comprises:
1. reacting in acetonitrile solution isobutyl chloroformate with a mixture consisting of 1-carbobenzoxy-cis- and trans-alkyl-L- and D-proline wherein the alkyl group is $R_1$, defined as above and a trialkylamine, followed by an addition of methyl 7-deoxy-7(S)-chloro thiolincosaminide of the formula:

in acetone-water; separating the insoluble 1'-demethyl-1'-carbobenzoxy-4'-depropyl-4'-alkylclindamycin in which $R_1$ is defined as above, from the soluble fractions containing the D-clindamycin analogues.

* * * * *